Jan. 18, 1966   J. L. GRATZMULLER   3,229,456
COOLING SYSTEMS FOR INTERNAL COMBUSTION ENGINES
Original Filed Dec. 19, 1960   7 Sheets-Sheet 1

INVENTOR
Jean L. Gratzmuller
BY Jacobi & Davidson
ATTORNEYS

INVENTOR
*Jean L. Gratzmuller*
BY Jacobi & Davidson
ATTORNEYS

United States Patent Office 3,229,456
Patented Jan. 18, 1966

3,229,456
COOLING SYSTEMS FOR INTERNAL
COMBUSTION ENGINES
Jean Louis Gratzmuller, 66 Blvd. Maurice-Barres,
Neuilly-sur-Seine, France
Original application Dec. 19, 1960, Ser. No. 76,929, now
Patent No. 3,162,182, dated Dec. 22, 1964. Divided
and this application Aug. 19, 1964, Ser. No. 396,456
Claims priority, application France, Dec. 17, 1959,
813,301, Patent 1,252,170; Mar. 9, 1960, 820,782;
Dec. 7, 1960, 846,155
9 Claims. (Cl. 60—13)

This application is a division of my copending application, Serial No. 76,929, filed Dec. 19, 1960 and is entitled to the priority date thereof.

This invention relates to the cooling of internal combustion engines, especially diesel engines and still more particularly diesel locomotive engines, by closed-circuit circulation of water under super-atmospheric pressure.

The coolant water in the cooling circuit of internal combustion engines including large-sized engines such as diesel locomotive engines and the like is generally maintained at largely atmospheric pressure even though the pressure in the water circuit may occasionally rise to a slight degree as the engine temperature rises in operation of the engine.

Current practice in the design and operation of such engine cooling systems is based on holding the cooling water temperature to a very low value. This is found necessary in order to take into account objectionable elevation of engine temperature due to high ambient temperatures and/or engine operation at high power output such as may occur when a locomotive is climbing a steep gradient. Another current reason for lowering the cooling water temperature occurs in mountainous country since the boiling point of water drops with altitude. The present invention is based on the general consideration that the average temperature of the coolant liquid in an engine cooling circuit can be safely increased thereby enhancing the efficiency of both the cooling system itself and that of the engine, by consistently maintaining the coolant liquid at a predetermined superatmospheric pressure under certain specific conditions to be fully described herein.

It has already been proposed to apply superatmospheric pressure to the coolant liquid in a closed-circuit engine cooling system in order to improve engine efficiency and to permit a reduction in the size of the radiator required. However, the pressurized liquid cooling systems proposed in the past are found completely inadequate for use in connection with vehicle engines, especially diesel locomotive power plants, nor have such prior proposals ever materialized to applicant's knowledge but have had to be abandoned, despite the outstanding advantages that would accrue from the use of such pressurized cooling systems.

It is hence an object of this invention to provide an improved pressurized cooling system for internal combustion engines which will be eminently suitable for practical use in connection with vehicle power plants, and especially diesel locomotive engines under the strenuous conditions of use thereof.

I have found that one important condition in order for a pressurized liquid cooling system to be of practical value is that the coolant liquid used should be completely homogeneous, and I have found that water when used under certain specific conditions to be specified herein provides an ideal coolant liquid for the purposes of the invention. Of course water is widely used in close-circuit engine cooling systems for the simple reason that it is so available. Water however as heretofore used has had a number of deficiencies as a coolant liquid. I have now found that when used in a pressurized closed-circuit system under the conditions to be specified herein, water provides an ideal coolant liquid which not only is cheap and available but more important possesses the homogeneity and other thermal characteristics that are ideally suited for such engine cooling systems. It should be understood that the word "water" as used herein and in the claims is intended to include mixtures of water with minor proportions of additions dissolved or suspended therein such as anti-freeze agents, corrosion-inhibitors, and the like.

One factor that has heretofore caused trouble in water cooling systems in internal combustion engines is an effect that may be termed dynamic corrosion, in the water jacket of the engine. It has been ascertained that dynamic corrosion arises as a result of the formation of steam bubbles at the hot points of the jacket, such bubbles leading to cavitation effects which cause rapid damage to the metal surfaces. It is an object of this invention to eliminate or minimize dynamic corrosion and I have found that this object can be achieved by positively preventing the formation of steam in the water system especially in the high-temperature areas of the system.

Another object is to permit safe operation of an internal combustion engine water cooling system at substantially higher water temperatures than were heretofore thought permissible, and consequently to improve the operating efficiency of the water engine cooling system and the operating efficiency of the engine cooled thereby. This object is achieved by maintaining the water strictly in the liquid phase throughout the cooling circuit, by the application thereto of a superatmospheric pressure substantially independent of the temperature of the water. I have found that this result can safely be achieved, with water as the coolant, with the use of pressures that are consistent with the mechanical resistance of the components of the system. It will readily be understood that by maintaining the water positively in the liquid phase it becomes possible to operate safely at considerably higher temperatures than heretofore, with the advantageous results noted above.

An essential consideration in the case of cooling systems for vehicle power-plants, is that there should be substantially no loss of coolant liquid out of the system so as to permit prolonged engine operation without having to replenish the water system. An object of this invention is to provide a pressurized water cooling system for a vehicle power-plant in which this result is attained. This important object has not to my knowledge ever been accomplished since the pressure cooling systems heretofore proposed have to my knowledge necessarily and inherently involved a high rate of coolant liquid loss, and this appears to have been one of the main reasons such systems have never gained practical recognition.

By the achievement of a pressurized water cooling system which is closed-circuit in the strictest sense of the word, since it can operate practically indefinitely without replenishment, I at the same time attain the further object of eliminating the necessity of continuously treating the water for the prevention of furring, scaling or incrustation, as was heretofore required, and which requirement has heretofore constituted a major drawback of water as a coolant.

In a cooling system according to the invention, the water is continually placed under a predetermined superatmospheric pressure not higher than the pressure range consistent with the mechanical resistance of the weakest component of the cooling system, such pressure being maintained at all times independently of the engine temperature, and the water is circulated at a rapid rate around the closed-circuit cooling system, means being provided for recycling into the system any water that may be discharged therefrom as steam.

By this means it is found that dynamic corrosion is practically eliminated, and the water can safely be maintained at a substantially higher temperature than was heretofore deemed safe, thereby improving the thermal efficiency of the engine, as well as that of the cooling system, so that e.g. the effective radiator area can if desired be greatly reduced.

A further advantage of the elevation of the average engine temperature thus achievable is that most of the fuels used often contain substantial amounts of sulfur, which has heretofore tended to condense on the metal surfaces of the combustion chambers as corrosive sulfurous and/or sulfuric compounds from the combustion gases; such corrosive condensation products are greatly reduced by an elevation of the engine temperature as achieved by the invention.

The invention attains yet other beneficial results. Since the drop in water temperature through the engine in the improved cooling system can be considerably less than in a conventional cooling system ceteris paribus, it becomes possible correspondingly to reduce the volume flow rate of air to be discharged through the radiator, and/or reduce the speed and power of the fans used to displace said air flow, thereby reducing both the power consumption by such air fans and the noise generated by their operation.

The radiator associated with a given engine should ensure the dissipation of a prescribed number of heat units per hour. The size, weight and cost of a radiator all become smaller as its inherent radiating efficiency is higher. The efficiency of a radiator increases as the volume of air flowing through it increases, all other factors remaining equal, and this in turn requires increasing the air flow section and increasing the air flow velocity. As regards the flow section, a limit is imposed by the dimensions of the radiator, especially in such vehicles as diesel locomotives, since the presence of water tubes correspondingly reduces the permeability of the radiator to air. The size and cost of the radiator are therefore factors limiting the effective surface area thereof. Moreover, the air flow velocity is limited by the large amount of power absorbed by the fan required to move the air and by the intolerable amount of noise which tends to be generated at high velocities.

A further object of the invention therefore, is to enhance to a substantial extent the efficiency of a radiator, the improvement being based on the fact that the weight of air which should traverse it per unit time is inversely proportional to the temperature elevation of the air flowing through the radiator.

Consequently, according to yet a further feature of the invention, the radiator is provided with dimensional characteristics, including the rate of flow of cooling air therethrough, such that the temperature of the cooling water will be substantially higher than the range heretofore considered as acceptable, and said temperature may, in fact, attain such high values under high ambient temperature conditions, that the vapour tension of the water will exceed atmospheric pressure. It will be understood that such a result cannot be achieved unless the pressure conditions specified above are fulfilled, for preventing formation of vapour lock in the liquid.

As will be seen from the examples given in the ensuing description, assuming a temperature elevation in the liquid consistent with the proper operation of the engine and corresponding to pressure values that will not be excessively high for constructional considerations, the efficiency factor of the radiator can quite easily, in practice, be multiplied by two or three, all other factors being equal.

It will thus be seen that by applying the teachings of the invention, the efficiency of the radiator is increased, whereby its size and weight can be considerably reduced; the formation of hot points is avoided; the cooling water pump efficiency is increased; dynamic corrosion of the engine wall surfaces is prevented; the inner wall surfaces of the engine are protected from attack by sulfur compound condensates; and the power consumption of the fan and the noise generated thereby are reduced. Furring of the water jacket and conduits are avoided without having to resort to complicated water-treating apparatus. Moreover, the operating efficiency of the water pump is improved because of the high inlet pressure to the pump, especially since such pressure substantially exceeds the vapour tension of water. Thus an excess of the order of 500 g./sq. cm. of the pump inlet pressure over the vapour tension of water at the pump inlet temperature gives excellent results. It is further noted that owing to the higher average temperature of the water circulating through the engine, engine operation in idling condition and at reduced power is considerably improved.

In one embodiment, the means for pressurizing the coolant water comprise a pump discharging water into the cooling circuit, and a spring-biased release valve is connected in said circuit for limiting the pressure therein to a prescribed value, means being further provided for collecting any water discharged from the pressure circuit through the release valve as well as for recovering and condensing any steam forming outside the circuit, i.e. beyond the release valve, and for recycling both the collected water and condensed steam into the circuit.

In another embodiment, the means for pressurizing the cooling water comprise means for creating and maintaining a body of pressure gas upon the surface of the water contained in a feeder tank or reservoir connected with the water circuit.

An engine radiator is inherently a fragile component since it must have a very high permeability to air. Hence it is important not to expose it to pressures substantially higher than that required for satisfying the above-specified conditions. Consequently, the pressure means used should be so designed as to be capable of maintaining a pressure at least equal to the minimum pressure required, but not substantially higher than said minimum value, in other words the pressure means must be such as to operate with a high degree of precision.

In one aspect a cooling system according to the invention may comprise a water reservoir, a circulation pump, conduit means connecting said reservoir and pump in a closed circuit with an engine water-jacket and at least one radiator, means for placing the water in said circuit under a predetermined superatmospheric pressure independent of water temperature and high enough to prevent the formation of steam at the hottest points of said water jacket, and means for positively preventing any loss of water from said circuit.

In cases where the engine is provided with a turbine-driven supercharger or compressor for compressing the air fed to the engine, it is desirable to cool the airstream discharged from the supercharger to the lowest possible temperature. This is desirable for two reasons. First, since the turbine driving the supercharger is driven by the engine exhaust gases it is advisable to reduce the exhaust gas temperature in order to avert damage to the turbine, and this requires reducing the engine air supply temperature. Moreover, in order to derive maximum power output from the engine the greatest possible weight of air should be introduced into the engine cylinders at each cycle and this requires that the air be supplied at a maximum specific gravity; the specific gravity in turn is increased by reducing the air temperature. Thus, the extent to which the air can be cooled at the engine intake sets a limit to the rate of supercharging that can effectively be applied to the engine.

In a system according to the invention, the water cooling radiator is operated at a relatively high temperature, say about 100° C. Hence it is feasible to pass the atmospheric cooling air, ahead of the main radiator, through a low-temperature auxiliary radiator operated say in a range of 40–50° C. without substantially impairing the operation of the main radiator which is operated under pressure and at a considerably higher temperature. Accordingly, in another aspect of the invention, the compressed air delivered from the supercharging compressor to the engine intake is passed, before being delivered to the engine, through a heat exchanger in heat transfer relationship with cooling water which is passed through a circuit including the aforementioned low-temperature auxiliary radiator, disposed ahead of the main radiator, of the engine cooling system, whereby the atmospheric air flows first through the low-temperature radiator and then through the main radiator.

In an internal combustion engine the lubricating oil should preferably be cooled to a temperature lower than that of the engine cooling water; desirably however the oil temperature should not be too low for optimum lubricating performance. According therefore to another feature of the invention, the engine lubricating oil is circulated through a heat exchanger in heat transfer relation with water that has already served to cool the compressed engine intake air in the aforementioned exchanger, so that the cooler water first flows through the intake air cooling exchanger and then flows through the lubricant oil cooling exchanger. In order to maintain the engine lubricating oil within its optimum temperature range usually on the order of from 70 to 80° C., the oil cooling exchanger is preferably provided with a thermostatically controlled bypass line connected e.g. in the cooling water circuit.

In cases where the invention is applied to an engine provided with an hydraulic or hydrodynamic transmission, it is further important to maintain the hydraulic fluid (oil) in such transmission within a prescribed temperature range. Hydrodynamic transmissions dissipate considerable energy as heat. According to a further feature of the invention, the water discharged from the main, high-temperature radiator of a cooling system of the invention is advantageously used for the further purpose of cooling the hydraulic transmission fluid; for which purpose such water flow is passed through a further exchanger in heat transfer relation with the transmission oil, prior to being delivered to the engine for the usual cooling purposes. In this way the transmission oil may be maintained in a temperature range approximating that of the engine, which usually constitutes the optimum temperature range for transmission operation.

In the case of very highly supercharged engines operating at high compression ratios and with consequently high cooling water temperatures, the amounts of heat discharged by way of the engine lubricating oil and the supercharged air cooling system tend to increase considerably. According to a feature of the invention, the engine cooling system may advantageously, comprise three water circuits. A first water circuit containing water at high temperature and high pressure serves to cool the engine and optionally the hydraulic transmission oil where provided; a second circuit containing water at moderate temperature and pressure serves to cool the engine lubricating oil and optionally the hydraulic transmission oil; and a third circuit, containing water at low temperature, serves to cool the supercharged air. In spite of the apparent complication that such a threefold water circuit may seem to introduce, it is found extremely advantageous in the case of large-sized engines such as diesel locomotive power plants.

According to a further feature of the invention, the system as a whole is so designed that the radiator in the low-temperature circuit is traversed by the full available cooling airstream, while the high- and intermediate-temperature radiators are arranged beyond the outlet from the first radiator. In one embodiment of this arrangement, the high- and intermediate-temperature radiators are arranged in series in respect to the airflow therethrough, while in other embodiments they may be arranged for airflow in parallel or in series parallel.

It is desirable that the air fans in the cooling system be driven only to the extent and/or for the periods required to ensure the desired cooling action, thereby to reduce both the power consumed by the fans and the noise produced by their operation. It is therefore desirable to regulate fan operation and this can be done either, on a gradual or on an all-or-nothing basis. When this is done however in the case of a cooling system including a plurality of air circuits at different temperatures as described above, including radiators connected in series along a common airstream, it is found that the heat variations in the three systems generally proceed at different rates whenever the engine operation is varied, and moreover the thermal inertias of the three systems differ, so that it would be unsatisfactory to regulate the fan drive in dependency on the particular requirements of only one of the three systems. Hence, according to a further feature of the invention, in cases where the cooling action is controlled by regulating the drive of the air fan or fans, the fan drive regulating means are preferably actuated under the combined action of separate sensing or control means positioned in each of the cooling circuits, in and so arranged and adjusted as to ensure that the fan drive will at any time be just sufficient to take care of the requirements of the most exacting one of the systems at the particular time considered. Such an arrangement will permit of maintaining the water temperature in each radiator at a value below an individual maximum as prescribed for the related circuit. If necessary moreover the temperature of each individual heat-exchange unit connected in the cooling circuit of each radiator, may be regulated by means of a thermostatic valve interposed in a bypass line connected with the cooling circuit of the particular unit.

Where the cooling system comprises two or three different-temperature circuits, one at least of which is under pressure, it is especially advantageous to provide the pressurizing means for the highest-pressure circuit in the form of a pump taking in water from a reservoir and discharging it into the circuit, the water pressure in the circuit being controlled by a biassed relief valve whence excess water will be discharged; the discharged water together with any steam generated therefrom beyond the relief valve being recycled into the circuit operating under the immediately lower pressure. Where more than two different-pressure circuits are uesd a similar operation may be repeated from each circuit to the next lower-pressure one until ultimately the steam will necessarily condense and the resulting overflow and condensation water is recycled. In such case again, it will be noted, all of the water in the system is recovered and a true closed-circuit operation is had, according to a fundamental feature of the invention.

Especially in connection with diesel locomotive engine cooling systems, it has been found that with the water reservoirs or feeders positioned towards the top of the locomotive, difficulties are encountered because of space and shape limitations due to the crowded conditions at the location indicated. The tank capacity is limited, and it is difficult to avoid considerable losses of water through overflow and also to inspect and gauge their contents. Frequently such overhead feeder tanks are filled until they overflow. Then in operation expansion due to temperature elevation produces more overflow. To remedy this, according to a further advantageous feature made possible by the invention the water tank is installed in a lower part of the locomotive structure, where ample space is usually available so that all of the above difficulties are averted. Maintenance and repairs of any of the cooling circuits are facilitated since the particular circuit may be emptied into the tank, positioned at the lowermost point of the system, by means of a suitably placed drainage valve, and no liquid is lost.

The invention further includes internal combustion engines, especially diesel engines, equipped with a cooling system including one or more of the afore-specified features of the invention.

A clearer understanding of the invention will be had from the ensuing detailed description of some exemplary embodiments thereof illustrated in the accompanying drawings, wherein.

Figure 1:
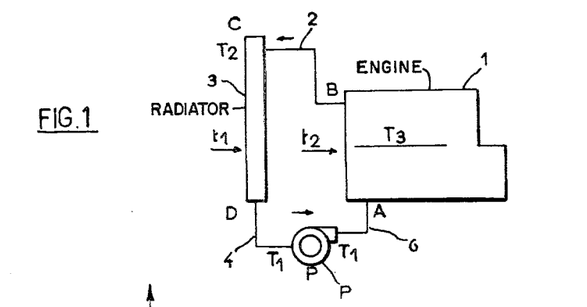
FIG. 1 is a diagram illustrating the principle of a conventional liquid cooling system for a diesel engine.

As shown schematically in FIG. 1, an internal combustion engine 1, e.g. a diesel engine, has a water cooling circuit including a conduit 2 connected with one point of the engine casing or jacket, a radiator 3 having its inlet connected with conduit 2, a further conduit 4 connecting the radiator outlet with a pump P such as a centrifugal pump, and a conduit 6 connecting the pump outlet back to the engine jacket.

Figure 2:
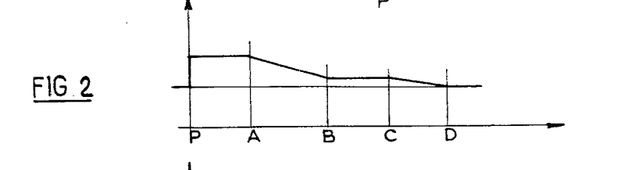
FIG. 2 is a graph indicating the liquid pressures in the cooling system of FIG. 1.

The pressure of the coolant water is a maximum at the outlet from the pump and a minimum at the pump intake. The pressure variations are illustrated in an approximate fashion by the graph of FIG. 2, which shows that the maximum water pressure is substantially maintained from the pump outlet to a point A which is the inlet connection to the engine casing. The pressure then drops gradually through the engine from point A to B. Throughout the connecting line 2 extending from the engine outlet 2 to the radiator inlet C, the pressure remains substantially constant. The pressure then sustains a further drop as it flows through the radiator from C to D; and finally it remains substantially uniform through line 4 from radiator outlet D to the pump inlet.

The system so far described is conventional. Before describing how the system is modified in accordance with the invention, some broad features of operation of the conventional engine cooling system will first be pointed out.

Let T1 be the temperature of the coolant water at the radiator outlet and at the engine inlet; T2 the water temperature at the engine outlet and at the radiator inlet; and T3 the maximum temperature the water is liable to attain at the hottest points of the cooling circuit within the engine. Further let $t1$ be the average temperature of the ambient atmospheric air, i.e. the air temperature at the radiator inlet, and $t2$ the air temperature at the radiator outlet.

In a usual radiator the temperature differential as between the average air temperature $t2$ at the radiator outlet and the average water temperature T2 at the radiator inlet is of the order of about 20° C. Thus the radiator outlet air temperature $t2$ is $t2=T2-20°$ C.

It is desired that the cooling system shall ensure acceptable cooling of the engine even under the highest ambient temperatures liable to be met with. In temperate climates such maximum air temperature is usually taken as about 35° C. Hence, the temperature elevation of the air through the radiator is:

$$t2-t1=T2-20°-35°=T2-55°$$

In conventional installations wherein the cooling liquid circuit is not under superatmospheric pressure, the maximum temperature T2 of the water at the motor outlet can be estimated by the following reasoning.

It is clear that the cooling process should be satisfactory at all altitudes where it may be operated. In case of a locomotive power plant, the highest operating altitude is usually taken in France as 1300 meters above sea level (altitude of the town of Modane). At such altitude the atmospheric pressure can be as low as 830 g./cm.$^2$, at which pressure the boiling point of water is about 93° C.

It should further be realised that after a diesel-powered locomotive has run for some time at full power e.g. in climbing a steep gradient, if it is then stopped and the engine is placed in idling condition, the cooling can become inadequate due to inadequate air flow through the radiator, so that the water temperature is liable to rise suddenly by a substantial amount which is usually taken as 7° C.

In sum, if it is desired to satisfy both the pressure conditions required to prevent dynamic corrosion as previously explained, and the pressure conditions required to prevent boiling of the liquid even in case of a sudden restarting from idling condition at high altitude, and including a safety margin for avoiding operation of the thermostat-controlled safety means usually provided, the maximum permissible water temperature T3 in the engine in normal operation is usually taken as 80° C., and the water temperature T2 at the radiator inlet is taken as 75° C.

The temperature elevation of the air, indicated above as $t2-t1=T2-55°$ is therefore 75°−55°=20° C. It will be seen that this temperature elevation is relatively small.

Figure 3:
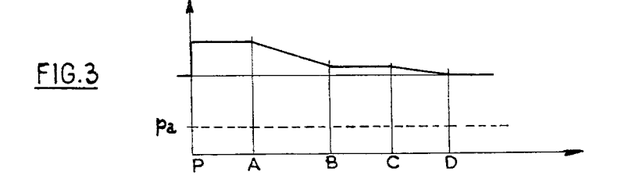
FIG. 3 is a similar graph relating to an improved cooling system according to the invention.

If now, according to the invention, the average pressure of the water in the cooling circuit is increased, the pressure diagram throughout the system will be as shown in FIG. 3, where $p_a$ indicates atmospheric pressure. It is evident from this diagram that it is now possible to raise the average temperature of the water without running any risk of formation of vapour, and hence, it becomes possible correspondingly to increase the amount by which the air temperature is raised as it flows through the radiator.

Thus, assuming a minimum pressure in the cooling system higher by 2 kg./cm.$^2$ than the surrounding pressure, the absolute pressure in the circuit, at the maximum altitude of 1300 m. will be:

$$830 \text{ g./cm.}^2 + 2000 \text{ g./cm.}^2 = 2830 \text{ g./cm.}^2$$

If the temperature difference $T3-T2$ is equated, as a precautionary measure, to 10° rather than 5°, and if similarly the temperature rise of the air through the radiator is doubled from the precedingly assumed value, i.e. is made equal to 40° C., then:

$$T2=55°+40°=95°$$

and $$T3=T2+10°=105°$$

At this last temperature of 105° C. the vapour tension of water is still only 1,230 kg./cm.$^2$. Since the pressure in the cooling system is 2,830 g./cm.$^2$, it will be seen that a pressure difference of 2,830−1,230=1,600 g./cm.$^2$ is still available for the prevention of dynamic corrosion, vapor-lock and the like.

In the example just described, the specific efficiency of the radiator has been doubled. A substantially greater increase in specific efficiency of the radiator is achievable according to the invention if a somewhat smaller margin of pressure is maintained for the purpose of dynamic corrosion prevention and the like. Thus assuming it is desired to multiply the radiator efficiency by the factor 3, by providing for a temperature elevation of 60° C. of the air through the radiator. The maximum water temperature would be 125° C., and at such temperature the vapour tension of water in 2,371 g./cm.$^2$ Thus a pressure reserve of 2,830−2,370=450 g./cm.$^2$ would still be available for the prevention of dynamic corrosion.

The above examples highlight the fact that pressurizing the coolant water in an engine cooling system provides a means of dramatically increasing the specific efficiency of the radiator in the system.

Since the weight of air that should be discharged per unit time through the radiator varies as the reciprocal of the temperature rise of the air, it is seen that if the temperature rise is multiplied threefold as in the last preceding example, all other factors being equal, the rate of air flow can be reduced threefold while still dissipating the same amount of heat. The remarkable advantages of a system according to the invention, in regard to size, weight and cost of the radiator and power consumption and noise of the fan, will be immediately apparent.

Various means be used according to the invention for pressurizing the water in the cooling system.

Figure 4:
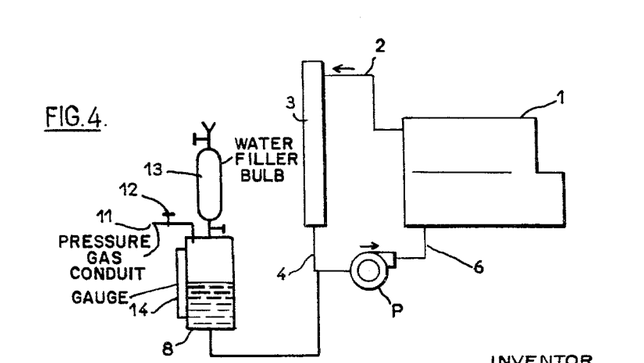
FIG. 4 illustrates in diagrammatic form an embodiment of the improved cooling system employing a cold pressure liquid feeder tank.

As shown in FIG. 4, a feeder tank 8 of the "cold pressure" type is used. The feeder 8 is connected with radiator outlet line 4. The top of feeder tank 8 is provided with a connector pipe 11 provided with a valve 12, for applying pressure to the feeder through connection with any suitable source of pressure gas. A filler bulb 13 having an upper and a bottom valve is also provided for filling the feeder tank without destroying the pressure therein. Further, a water contents gauge is schematically shown at 14. It is noted that the system thus described is strictly closed-circuit, and will sustain no loss of water in operation.

Figure 5:
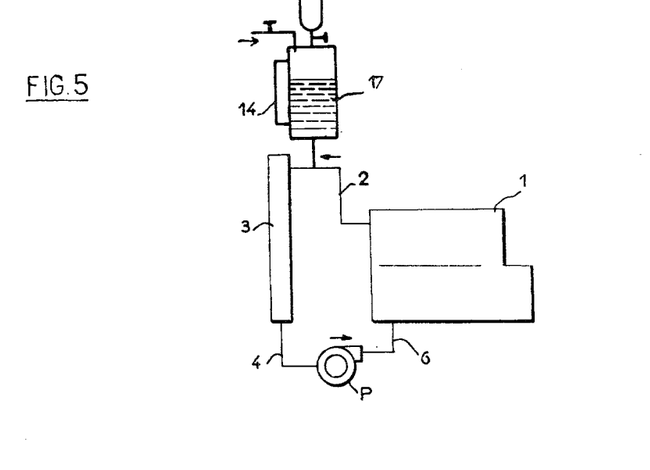
FIG. 5 shows another embodiment using a hot pressure liquid feeder tank.

The embodiment just described has a drawback in that it does not provide for an automatic de-gassing of the cooling system. Accordingly, in a modified embodiment shown in FIG. 5 the cold feeder of FIG. 4 is replaced by a "hot pressure feeder" 17 connected with the radiator inlet line 2. Here again strictly closed-circuit operation is provided. While this arrangement overcomes the just-mentioned drawback, it does however possess the difficulty that the temperature of the water in the feeder and of the overlying air cushion varies with temperature variations in the engine, and correspondingly varies the pressure in the feeder, thus making it difficult to adjust the initial desired pressure in the feeder, since such initial adjustment must make allowance for engine temperature.

Figure 6:
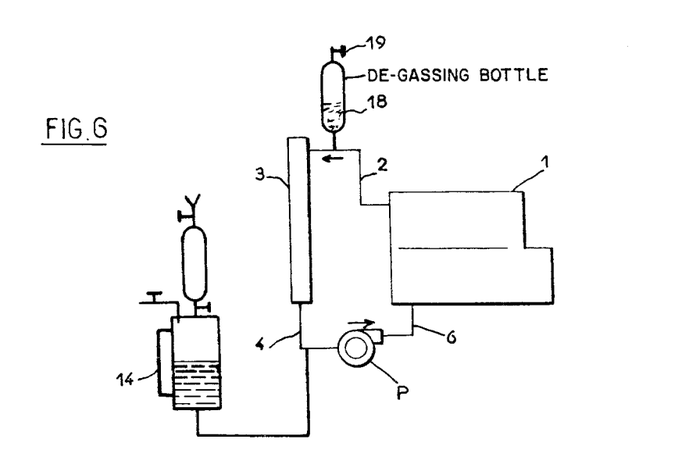
FIG. 6 shows a modification of the system of FIG. 4.

FIG. 6 illustrates another modification which overcomes both shortcomings of the embodiments so far described. This system differs from the system of FIG. 4 in that it includes a de-gassing bottle or bulb 18 connected with the radiator inlet line 2. A vent valve 19 is provided at the top of bulb 18. The gases contained in the water gradually collect in the free space of bulb 18 whence they can be vented to atmosphere by actuating vent valve 19 from time to time. The resulting system again constitutes a strictly closed circuit, permitting prolonged operation without having to add make-up water.

Figure 7:
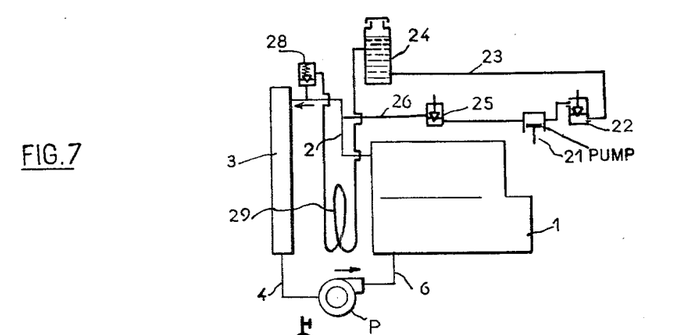
FIG. 7 shows an exemplary embodiment of a cooling system according to the invention including a pump as the pressurizing means.

In the FIG. 7 modification, the means for pressurizing the water in the cooling system comprises a pump schematically shown at 21. The pump has its inlet connected through intake check valve 22 and line 23 with a feeder tank 24 at atmospheric pressure, and has its outlet connected through outlet check-valve 25 and line 26 with the radiator inlet pipe line 2. Any over pressure occurring in this system due to expansion or to excessive delivery of pump 21, is automatically compensated for by a corresponding discharge of liquid water through the release valve 28 into the feeder tank, by way of a condenser coil 29 positioned adjacent to the radiator. In this coil any steam formed beyond or down stream from valve 28 owing to relief of the pressure, is condensed. Thus it is seen that in this system also there is no loss of water from the circuit. Any water escaping from the circuit in liquid form is recovered, and any vapour that may form outside the pressure circuit is condensed and also recovered.

Figure 8:
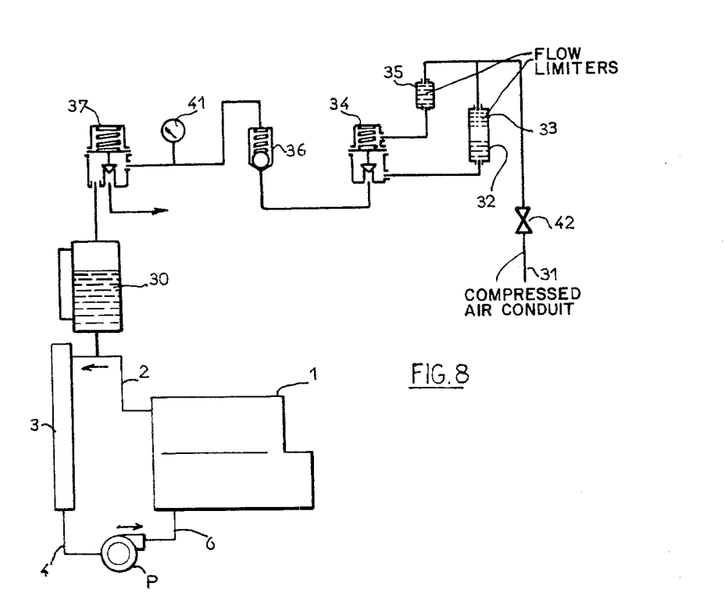
FIG. 8 shows a modification wherein the pressure means include a flow limiter and a differential valve.

In FIG. 8 is shown a further modification of the means for pressurizing the cooling water, here provided in the form of a source of compressed air such as a store of air under a pressure of say 7 kg./cm.$^2$ provided on board the locomotive powered by the engine to be cooled. A feed line 31 connected with the source of pressure air has its other end connected with the top of a feeder tank 30 by way of a series of flow- and pressure-regulating devices including a flow limiter 32 provided with a filter 33, a differential valve 34 having one inlet connected to the outlet of flow limiter 32 and its other inlet connected to the outlet of another flow limiter 35 supplied from line 31, a check valve 36 connected in series with the outlet of differential valve 34 in such a sense as to prevent return of the fluid towards said valve, and a holding valve 37 serving to maintain a prescribed pressure in the system while venting excess pressure to atmosphere. A pressure gauge 41 serves to check the pressure in the system and a manual cutoff valve 42 interposed in feed line 31 makes it possible to isolate the system from the pressure air source when desired.

In one example, the flow limiter 32 is adjusted to provide a volume flow rate of about 2 liters compressed air per minute. The differential valve 34 reduces the air pressure from 7 to 1.250 kg./cm.$^2$ and the relief valve 37 opens when the pressure exceeds 1.250 kg./cm.$^2$. In operation the excess flow of compressed air, which is very low, being on the order of about 2 liters per minute, escapes continuously from the release valve 37 and constitutes in practice a negligibly low leakage loss.

When the engine is started, assuming the compressed air source is supplied by a compressor driven by the engine, it is found that the pressure builds up to the desired value within the cooling system well before the temperature of the cooling water in the engine has reached a value such that its vapour tension is higher than the water pressure in the system.

The flow limiter 35 serves to prevent damage to the differential valve 34 on opening of the cutoff valve 42. In the absence of the limiter 35 the full pressure from the source would be suddenly applied to one side of the diaphragm in valve 34 while its other side would only be exposed to pressure some time later owing to the pressure drop occurring in the main flow limiter 32.

It can readily be seen that in the system last described no loss of water is incurred in operation, since only some air is able to escape from the pressure circuit.

Figure 9:
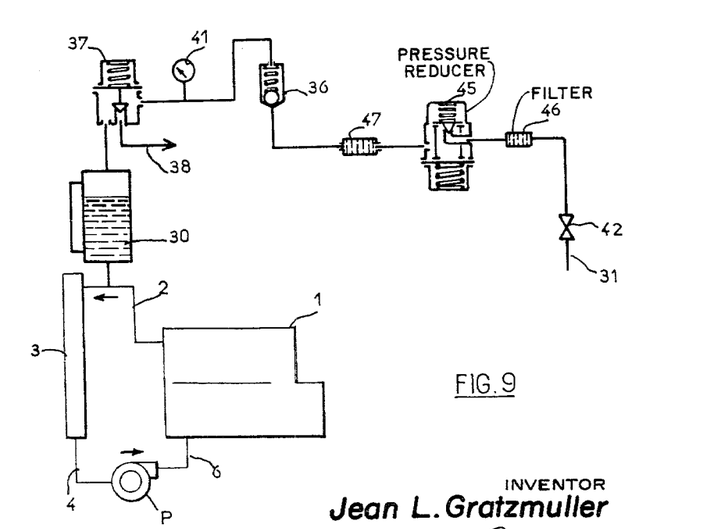
FIG. 9 shows a modification of FIG. 8 using a pressure reducer instead of a differential valve.

In the embodiment described flow limiter 32 is supplied with compressed air at the source pressure, and it should be noted that the degree to which the flow section in the flow limiter can be reduced while still providing a smooth flow, is limited. Hence, should it be desired further to reduce the flow rate, an alternative solution may be used which lies in supplying the flow limiter under a pressure lower than the source pressure. This is shown in FIG. 9 which differs from FIG. 8 in that the pressure of the air delivered from the source is reduced in a pressure reducer 45 ahead of which a filter 46 is connected; the flow limiter 47 is connected beyond the reducer so as to be supplied under a pressure considerably lower than the source pressure. Hence for a given flow section area it will deliver a lower flow rate. As in FIG. 8, only air but no water is allowed to escape from the pressure circuit of FIG. 9.

Figures 10, 12:
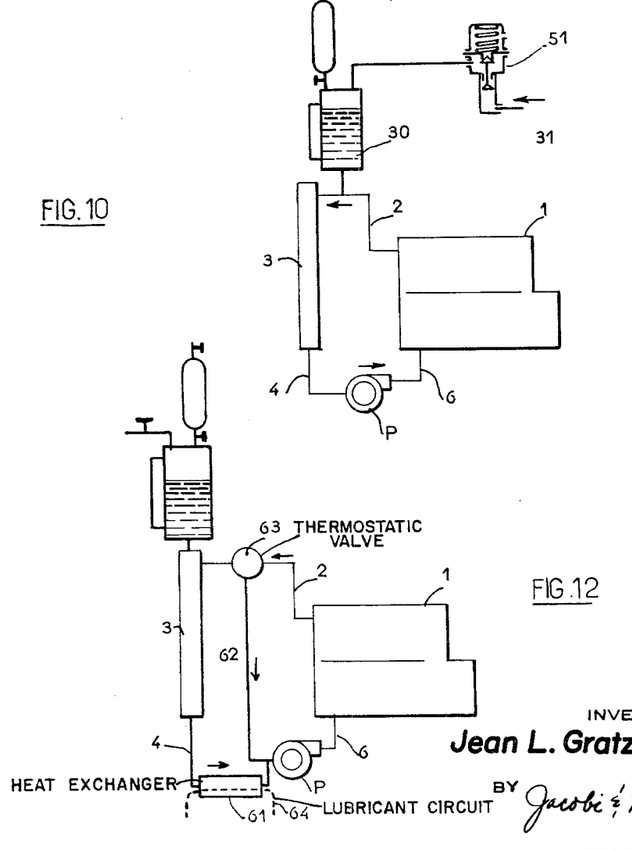
FIG. 10 shows another embodiment utilizing a pressure-reducer and a water-separator device.
FIG. 12 illustrates a modification of the invention including means for cooling the engine lubricant.

FIG. 10 illustrates a modification of the means for pressurizing the cooling water system from a source of compressed air wherein the source is connected to feeder tank 30 by way of a pressure reducer and water separator device 51 of any suitable conventional type, only schematically shown. This system too operates strictly in closed-circuit conditions insofar as the water flow is concerned.

Figure 11:
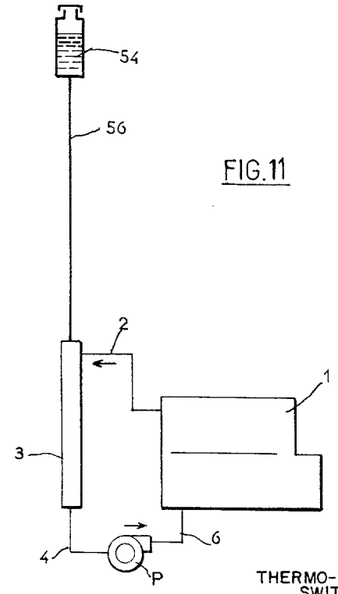
FIGURE 11 illustrates a modification wherein the pressure means comprise an overhead reservoir at substantial elevation.

A different modification, applicable to fixed engine installations, is illustrated in FIG. 11. This is a simplified system which comprises an overhead reservoir or pressure tank 54 at considerable elevation connected to the cooling system by a line 56. The pressure in the cooling circuit is in this case determined by the height of the liquid column contained in line 56 and tank 54, which latter is open to atmospheric pressure to allow for any variations in the liquid volume due to temperature changes. No water can escape from the system nor can any water be lost as steam since no steam is produced in this case.

FIG. 12 illustrates a system according to the invention including means for cooling the engine lubricant oil. The oil cooling means comprise a water/oil exchanger 61 interposed between the outlet of radiator 3 and one end of a radiator by-pass line 62 controlled by a thermostat valve 63 operated in response to the temperature of the water at a selected point of the circuit, e.g. the engine outlet as shown, so as to regulate the proportion of water flow respectively through the radiator and the by-pass line 62.

The lubricant oil circuit is partially indicated at 64. In view of the superabundant character of the radiator in a cooling system according to the invention, as earlier noted, the water is discharged from the radiator at a considerably lower temperature than that of the water circulating around the closed circuit between the engine and pump through by-pass line 62, so that highly satisfactory cooling of the oil can thus be obtained. The water circulates in a closed circuit as in FIG. 5, and there is no loss of water in operation.

Figure 13:
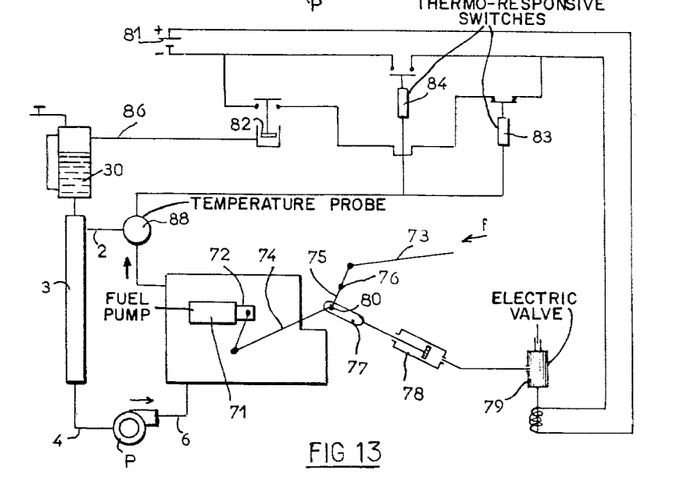
FIG. 13 illustrates automatic safety means acting to place the engine in an idling condition in an emergency.

FIG. 13 illustrates a safety device whereby the engine is automatically set to idling condition in case the coolant water temperature should exceed a prescribed maximum value. As shown, 71 is a diesel fuel injection pump and 72 an injection pump regulator. The injection pump regulator is operated from a throttle control link 73 through linkage shown as including a bellcrank lever 75 pivoted on stationary pivot 76 and a link 74. The pivot 80 connecting link 74 to the related end of bellcrank lefer 75 is slidably mounted in a slotted slideway 77 secured to one of the cooperating cylinder-and-piston elements of a compressed-air ram actuator generally designated 78. Ram actuator 78 is controlled by way of an electrically operable valve 79 having its operating solenoid connected in a circuit including a D.-C. source 81 and including three automatically actuated switches 82, 83, 84, switch 82 being a pressure responsive switch and switches 83, 84 temperature responsive switches. The switches 82 and 83 have their contacts connected in series in the energizing circuit for the solenoid of valve 79, whereas switch 84 is shunted across the other two switches 82 and 83.

Switch 82 is controlled in response to the pressure obtaining in feeder tank 30 e.g. through a conventional bellows or diaphragm connected with the feeder through a line 86. When the feeder tank pressure drops below a prescribed minimum e.g. 1,500 kg./cm.$^2$, switch 82 is actuated to closed position.

Switches 83 and 84 are jointly controlled from one or more temperature probes 88 disposed in the upper part of the cooling water circuit, e.g. in line 2 as shown, and are respectively adjusted so as to operate at different temperatures, e.g. 85° and 120° C. respectively.

The system is shown in the normal operating condition. The throttle control link 73 can be freely actuated in the direction indicated by arrow $f$. During such displacement, the pivot 80 will simply slide along the slotted member 77 which remains stationary. On the other hand, in case of an emergency condition detected by one or more of the pressure- and temperature-responsive switches 82, 83, 84, ram actuator 78 is operated to displace the slotted slideway 77 with the pivot 80 therein leftward and upward in the arrangement shown, whereupon the link 74 acts on the fuel injection regulator 72 to place it in the setting causing idling operation of the engine.

It should be noted as regards the operation of the emergency arrangement just described, that the arrangement does not interfere with the normal starting of the engine. After an idle or shutdown period of some length it may well happen that no store of compressed air is available in the system, so that the cooling water circuit is not pressurized. In such conditions the pressure-responsive switch 82 is closed, but both temperature-responsive switches 83 and 84 are open, so that the emergency electric valve system is deenergized. Moreover, on starting the system, the pressure in the cooling circuit will build up to its requisite value well before the water temperature has attained the value for which temperature-responsive switch 83 (and with greater reason switch 84) is set; hence the contacts of switch 82 will open before the contacts of switch 83 are closed. The emergency device therefore will not operate nor will it interfere with the normal operation of the engine.

Moreover, in normal operation the pressure in the cooling water system acts to maintain the pressure-responsive switch 82 in open-circuit condition. With the water temperature less than e.g. 120° C., the switch 84 is also in open-circuit condition. Even though the temperature-responsive switch 83 is in closed-circuit condition (temperature higher than 85° C.) it will thus be seen that the emergency circuit remains open and the emergency system will not operate to place the engine in idling condition.

On the other hand, a water temperature higher than 120° C., even when the circuit is pressurized, will cause thermo-switch 84 to open and place the engine in idling condition. Similarly a drop in the pressure to a value less than the prescribed value will close the pressure-switch 82, and if the temperature again is higher than 85° C., the thermoswitch 83 is closed and the emergency system operates, placing the engine in its idling setting.

Figure 14:
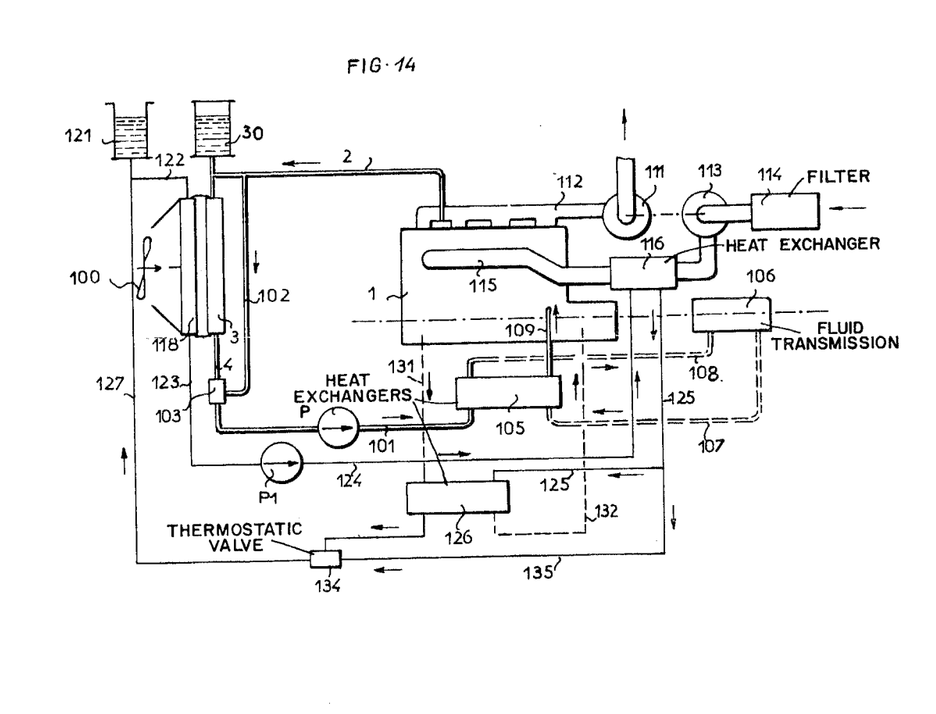
FIG. 14 schematically illustrates a further embodiment of an engine cooling system provided for an engine provided with an exhaust-driven turbo-compressor supercharger and a hydraulic transmission unit.

In the form of the invention illustrated in FIG. 14, there is shown an internal combustion engine 1 and a main or high-temperature radiator 3 connected in a pressurized cooling water system comprising a conduit 2 having one end connected to the engine cooling water outlet and its other end connected to a pressure tank 30 and to the top inlet of the radiator 3, while the bottom outlet of the radiator is connected through a line 4 with the intake of a circulation pump P which has a discharge line 101 connected with the engine water-jacket inlet. A by-pass line 102 is connected in parallel across the radiator 3 and flow therethrough is controlled by means of a valve 103 thermostatically operated in response to the water temperature at the inlet of pump P.

According to a feature of the invention, the water intake line 1 on its way to the engine water intake is passed through a heat exchanger 105 in heat exchange relation with the oil supplied to a hydrodynamic transmission unit 106 of any conventional type driven from the engine. The oil from unit 106 is passed to heat exchanger 105 over a line 107 and is returned to the unit 106 over a line 108, while the water is applied to the heat exchanger 105 over line 101 and is thence passed to the engine 1 over line 109.

In the embodiment illustrated the engine 1 has a turbine-driven supercharging compressor unit associated with it, consisting of the turbine 111 positioned in the exhaust pipe 112 to be driven by the engine exhaust gases and the compressor 113 which is supplied with atmospheric air through a filter 114 and discharging the compressed air into the air intake pipe 115 of the engine through a heat exchanger 116.

The cooling water circuit for heat exchanger 116 extends through an auxiliary or low-temperature radiator 118 positioned forwardly of the main radiator 3 and having the same effective section area as it so that the same airstream propelled by fan 100 flows first through low-temperature radiator 118 and then through the main radiator 3, in series.

The cooling water circuit for the low-temperature radiator 118 is designed for operation at a relatively low temperature range and at ordinary atmospheric pressure. Said circuit includes a water tank 121 connected with the top of the radiator 118 by a line 122, the cool water outlet at the bottom of the radiator 118 being connected by a line 123 with the intake of a water pump P1 which through a line 124 discharges water into the heat exchanger 116 whence the water is passed by a line 125 to a lubricant-cooling heat exchanger 126 and over line 127 to the top of auxiliary radiator 118. Line 131 serves to deliver the engine lubricant oil to heat exchanger 126 and line 132 serves to return the cooled oil to the engine. A line 135 branching off from water return line 125 by-passes heat exchanger 126 and is provided with a thermostatically controlled valve 134 for thus regulating the temperature at the water outlet from said exchanger.

The following numerical indications given by way of example relate to a practical system of the type just described which has been successfully operated.

The amounts of heat to be dissipated by the system were: Engine cooling water, 300 cal./H.P./hr. Turbo-compressor cooling water, 50 cal./H.P./hr. Engine oil cooling water, 30 cal./H.P./hr. Hydraulic transmission oil cooling water, 100 cal./H.P./hr.

It was desired that the water temperatures should not exceed the following maximum values in the various circuits: Engine cooling circuit, 115° C. Turbo-compressor cooling circuit (as low as possible). Engine oil cooling circuit, 80° C. Hydraulic transmission oil cooling circuit, 100° C.

From the above figures, the amount of heat to be dissipated per horsepower/hour in the low-temperature radiator is seen to be 50+30=80 cal./H.P./hr. and the amount of heat to be dissipated in the main radiator 3 is 300+100=400 cal./H.P./hr.

Calling $t1$ the maximum ambient atmospheric temperature, $t2$ the air temperature at the outlet from low-temperature radiator 118 and at the inlet to the main radiator 3, and $t3$ the air temperature at the outlet from main radiator 3, it is evident that $$t2 = t1 + (t3-t1)\frac{80}{400+80}$$

If the maximum ambient atmospheric temperature $t1$ is taken equal to 35° C. and the temperature $t3$ of the air discharged from the main radiator is made equal to 95° C., the above equation yields $$t2 = 35 + (95-35)\frac{80}{480} = 35 + 10 = 45° \text{ C.}$$

Thus it is seen that the temperature elevation of the air through the auxiliary radiator 118 ahead of main radiator 3 is only about 10° C. This represents but a small fraction of the temperature elevation of the air through the main radiator and does not impair the efficiency of the main radiator.

The coolest water in the system is at the outlet from low-temperature radiator 118 and this is directly passed to the supercharging air cooling exchanger and thence to the engine oil cooling exchanger where the amount of heat to be dissipated per horsepower/hour is lowest of all.

In the high-temperature cooling circuit, the water from the bottom outlet of main radiator 3 is first used to cool the hydraulic transmission oil and only thereafter is it passed to the engine for cooling the latter.

In another exemplary installation relating to an engine without a hydrodynamic transmission, the maximum engine cooling water temperature was taken as $t3=100°$ C. The amount of heat to be dissipated by the water in the high-temperature circuit is therefore only 300 cal./H.P./hr, instead of 400 cal./H.P./hr. as in the preceding example, and the intermediate air temperature between the two radiators is now $$t2 = t1 + (t3-t1)\frac{80}{380}$$

$$= 35 + (100-35)\frac{80}{380} = 35 + 14 = 49° \text{ C.}$$

in this case it is seen that the temperature elevation of the air through the low-temperature radiator 118 is about 14° C.

In the system shown in FIG. 14 various modifications are of course possible. Thus the thermostatic control valve shown interposed in the water circuit of the engine oil cooling exchanger may, if desired, be interposed instead in the water circuit of the exchanger. Moreover, the means for regulating the water temperature at the inlet of the pump associated with the high-temperature circuit may comprise, rather than the thermostatic valve shown, any other suitable device, e.g. means for controlling the drive speed of the air fan.

Figures 15, 16, 17:
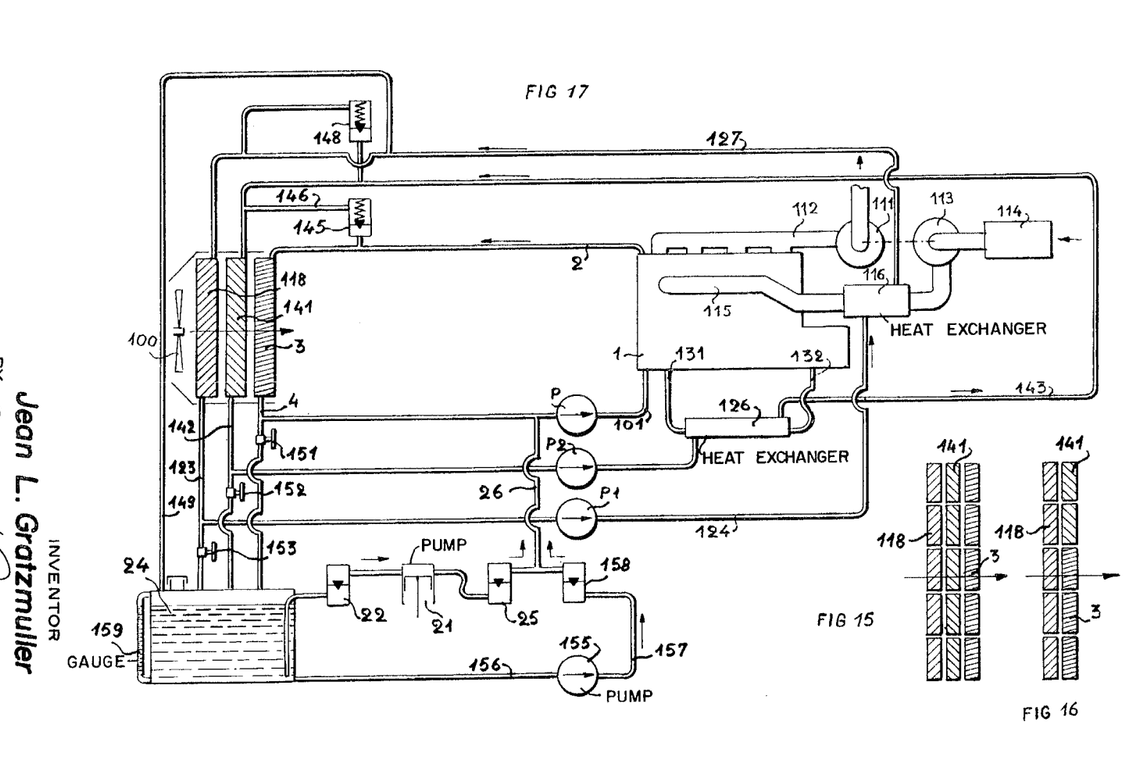
FIGS. 15 and 16 are diagrammatical illustrations of two alternative lay-outs of radiator structures in an engine cooling system according to the invention.
FIG. 17 shows another form of cooling system for an engine provided with an exhaust-driven supercharger unit.

In the system shown in FIG. 15, there are schematically shown three radiator structures, including a first radiator 118 in the supercharging air cooling circuit, a second radiator 141 in the hydraulic transmission oil cooling circuit, and a third or main radiator 3 for the main engine water cooling circuit. The honey-comb (or equivalent) structures of the three radiators are arranged in series relation, in the order shown, so as to be traversed by a common airstream delivered by one or more fans such as 100. The foremost radiator in the airstream, and hence the one exposed to the coolest air, is the radiator 118 for the supercharging air cooling circuit, since it is desirable to feed air to the engine at the lowest possible temperature. Next comes the transmission oil radiator 141 and last is the main radiator 3 which contains high-temperature, high-pressure water for the main engine cooling function.

In the modified arrangement shown in FIG. 16 the supercharging air cooling radiator 118 is again placed foremost in the airstream, but the transmission oil cooling radiator 141 and the main radiator 3 are here connected in parallel so that the airstream divides between them. It will be understood that in FIGS. 15 and 16 only the air flow paths through the radiator structures have been schematically shown, and that the corresponding water flow paths would be provided as will be readily understood from earlier explanations.

The engine cooling system shown in FIG. 17 generally includes the same chief components as those described with reference to FIG. 14. Thus the system includes the internal combustion engine 1, the main or high-temperature radiator 3 interposed in a pressure water cooling system including a line 2 connected with the water outlet from the engine, a radiator outlet line 4, a pump P and a return line 101 for recycling the water to the engine.

An intermediate radiator structure 141 is connected in the transmission oil cooling circuit, which is likewise pressurized, and includes in this example a heat exchanger 126 in which the transmission oil is delivered by a line 131 and whence said oil is discharged by a line 132 into the hydraulic transmission. The water circuit associated with radiator 141 comprises line 142, pump P2 and line 143 returning to the top of radiator 141.

The engine is further provided with an air supercharging turbo-compressor comprising the turbine 111 positioned in the engine 112 and driving the compressor 113 which is supplied with atmospheric air through filter 114 and discharges the compressed air into engine intake 115 through a heat exchanger 116. The water circuit for heat exchanger 116 includes a third or low-temperature radiator 118 disposed ahead of the other two so as to receive the airstream from fan 100 at lowest temperature. The supercharging air cooling water circuit is designed for operating at relatively low temperature nor the water therein pressurized. The circuit includes pump P1 which circulates the water round the circuit including line 124, exchanger 116, line 127, radiator 118 and line 123 to pump P1.

In the main or high-temperature engine water cooling circuit including main radiator 3 the water is supplied from a sump or reservoir 24 by a volumetric type pump 21 having its intake connected with sump or reservoir 24 by way of an intake check valve 22, and its outlet being connected through a discharge check valve 25 and a line 26 to the line 4 connected with the bottom water outlet of main radiator 3. With the circuit full of water, excess water is permanently discharged from the circuit by the low-delivery volumetric pump 21 through a spring-biassed relief valve 145 through line 146 into the transmission oil water cooling circuit including radiator 141. Similarly, excess or overflow water from the circuit including the second radiator 141 is discharged by relief valve 148 into the unpressurized water circuit including the low-temperature radiator 118; and the surplus water from this last circuit is finally returned over line 149 to the reservoir 24.

Each of the three circuits is provided with a drain valve 151, 152 and 153 respectively discharging into sump 24.

To enable rapid filling of the three water circuits, there has been shown an additional or filling pump 155, which may be manually or power operated, taking up water from sump 24 by a line 156 and discharging it through a line 157 provided with a non-return check-valve 158 into the first circuit or engine cooling water circuit of radiator 3, i.e. the high-temperature high-pressure water circuit. Reference 159 indicates a level gauge tube for indicating the water level within the reservoir or sump 24. It is noted that this sump is conveniently positioned near the base of the system.

It will be noted that in the system shown radiator 118 associated with the supercharging air cooling circuit is first traversed by the full available airstream, and thus receives cooling air at lowest temperature; while the other two radiators are positioned therebeyond to be traversed by the same airstream, their arrangement being serial, in accordance with the layout shown in FIG. 15. However, the series-parallel arrangement of FIG. 16 may if preferred be used.

It will be apparent that a large number of modifications may be made in the embodiments of the invention illustrated and described and that features shown in connection with certain of said embodiments may be combined with others in various ways without exceeding the scope of the invention.

What is claimed is:

1. In a system for cooling an internal combustion engine having a cooling jacket and a compressor driven by the engine exhaust for supercharging said engine, the combination comprising:
    independent first and second cooling liquid circuits;
    said first cooling liquid circuit including a first air-cooled radiator, a first pump and first conduit means interconnecting said first radiator, said first pump and said cooling jacket together to form a closed circuit in which said first pump circuates cooling liquid through said first radiator and said cooling jacket;
    said first cooling liquid circuit further including pressurizing means therein for creating a superatmospheric pressure on the cooling liquid therein to prevent the formation of steam within said circuit;
    said second cooling liquid circuit including a second air-cooled radiator, cooler means coupled between said compressor and said engine, a second pump and second conduit means interconnecting said second radiator, said second pump and said cooler means together to form a circuit in which said second pump circulates cooling liquid through said second radiator and said cooler;
    said second circuit cooling liquid being maintained at a pressure and temperature lower than that of said first circuit cooling liquid;
    said first and second radiators being disposed in spaced parallel juxtaposition; and,
    means adjacent said second radiator positively producing a cooling air stream which initially flows across said second radiator and thereafter flows across said first radiator, thereby assuring that said second circuit cooling liquid temperature is maintained lower than said first circuit cooling liquid temperature.

2. The combination defined in claim 1 wherein said cooler means comprises a heat exchanger.

3. The combination defined in claim 2 but further characterized by said engine including a lubricating oil system and a second heat exchanger connected between said second cooling liquid circuit and said lubricating oil system whereby said second circuit cooling liquid also cools said engine lubricating oil.

4. The combination defined in claim 2 but further characterized by said engine including a hydraulic transmission and a further heat exchanger connected between said first cooling circuit and said transmission whereby said first circuit cooling liquid also cools the hydraulic fluid in said transmission.

5. The combination defined in claim 1 wherein said second circuit cooling liquid circuit is at atmospheric pressure.

6. The combination defined in claim 1 but further characterized by said engine including an auxiliary liquid system and by a third cooling liquid circuit for cooling said auxiliary liquid.

7. The combination defined in claim 6 wherein said third cooling liquid circuit includes an intermediate radiator disposed between said first and second radiators, a third pump, auxiliary cooler means coupled with said auxiliary liquid system, and third conduit means interconnecting said third pump, said intermediate radiator and said auxiliary cooler means to form a circuit in which said third pump circulates cooling liquid through said intermediate radiator and auxiliary cooler means to cool said auxiliary liquid.

8. The combination defined in claim 7 wherein said pressurizing means is a pump which introduces cooling liquid into said first circuit from a reservoir.

9. The combination defined in claim 8 wherein said first and second circuits each include a pressure regulating valve which maintains, at least in said first circuit, a predetermined pressure of sufficient magnitude to prevent the formation of steam in said first and second circuits.

References Cited by the Examiner

UNITED STATES PATENTS

| | | | |
|---|---|---|---|
| 2,365,166 | 12/1944 | Bay | 123—41.33 |
| 2,392,723 | 1/1946 | Chandler | 123—41.33 |
| 2,417,237 | 3/1947 | Chandler | 123—41.33 |
| 2,423,929 | 7/1947 | Dilworth et al. | 123—41.33 |
| 2,729,203 | 1/1956 | Prendergast | 123—41.33 |

FOREIGN PATENTS 1,236,246  6/1960  France.

MARK NEWMAN, *Primary Examiner.*

RICHARD B. WILKINSON, LAURENCE M. GOODRIDGE, *Examiners.*